(No Model.) 8 Sheets—Sheet 3.

G. H. REYNOLDS.
HYDRO ENGINE FOR OPERATING ELEVATORS.

No. 518,700. Patented Apr. 24, 1894.

Witnesses:—

Inventor:—

(No Model.)　　　　　　　　　　　　　　　　8 Sheets—Sheet 4.
G. H. REYNOLDS.
HYDRO ENGINE FOR OPERATING ELEVATORS.
No. 518,700.　　　　　　　　　Patented Apr. 24, 1894.

(No Model.) 8 Sheets—Sheet 6.

G. H. REYNOLDS.
HYDRO ENGINE FOR OPERATING ELEVATORS.

No. 518,700. Patented Apr. 24, 1894.

(No Model.) 8 Sheets—Sheet 7.

G. H. REYNOLDS.
HYDRO ENGINE FOR OPERATING ELEVATORS.

No. 518,700. Patented Apr. 24, 1894.

Witnesses:—
D. N. Hayward
O. Sundgren

Inventor:—
Geo. H. Reynolds (No Model.)

G. H. REYNOLDS.
HYDRO ENGINE FOR OPERATING ELEVATORS.

No. 518,700. Patented Apr. 24, 1894.

UNITED STATES PATENT OFFICE.

GEORGE H. REYNOLDS, OF NEW YORK, N. Y., ASSIGNOR, BY MESNE ASSIGNMENTS, OF ONE-HALF TO THE NATIONAL COMPANY, OF CHICAGO, ILLINOIS.

HYDRO-ENGINE FOR OPERATING ELEVATORS.

SPECIFICATION forming part of Letters Patent No. 518,700, dated April 24, 1894.

Application filed March 29, 1890. Serial No. 345,856. (No model.)

*To all whom it may concern:*

Be it known that I, GEORGE H. REYNOLDS, of New York, in the county and State of New York, have invented a certain new and useful Improvement in Hydro-Engines for Operating Elevators, of which the following is a specification.

My improvement relates to that class of apparatus for operating elevators in which hydraulic power is employed to control the movement of the elevator.

The objects of the improvement are primarily to use steam in operating the apparatus in proportion to the weight to be lifted only, to lock the elevator car against movement at any desired point in its transit in whichever direction it may be moved and also to regulate the speed at which the car shall move.

I will describe my improvement in detail and then point out the novel features in claims.

In the accompanying drawings

Similar letters of reference designate corresponding parts in all the figures.

Figure 3:
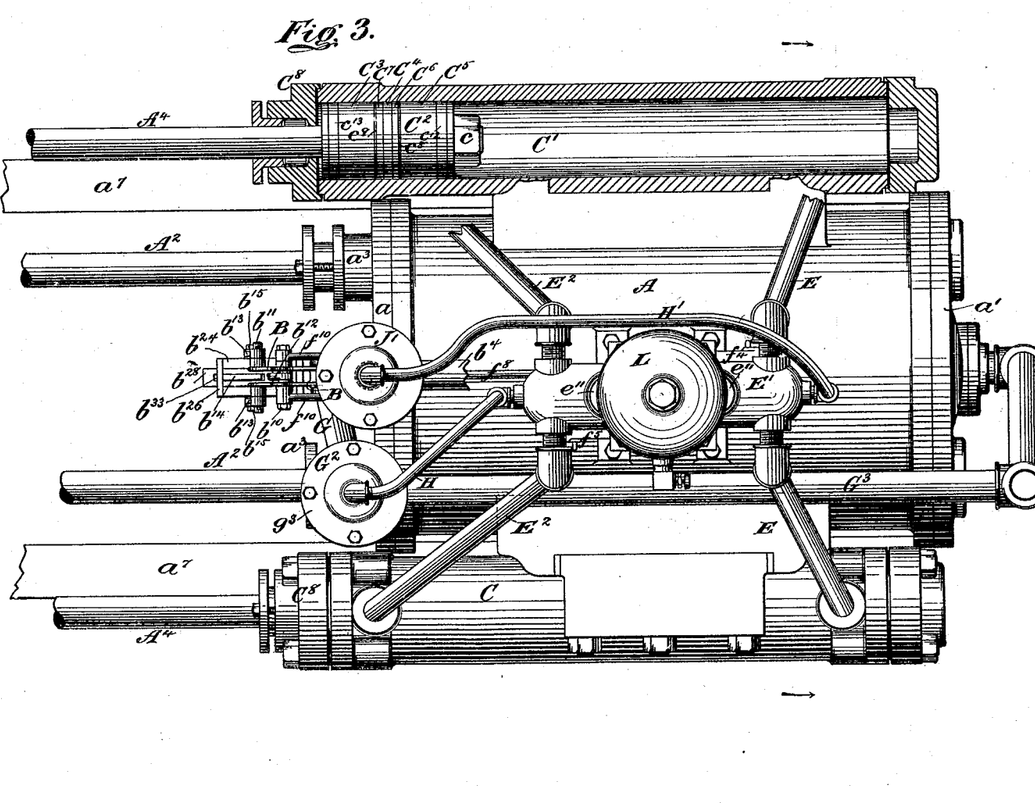
Fig. 3 is a plan or top view of the same also partly broken away and part being in horizontal section.

In carrying out my improvement I employ a steam cylinder A provided with a front head $a$ and a rear head $a'$. This cylinder is supported in any suitable manner in a base $a^2$. Arranged within the cylinder A is a piston A'. In the example of my improvement shown this piston is provided with two piston rods $A^2$ illustrated more clearly in Figs. 3 and 4. These piston rods extend through suitable stuffing boxes $a^3$ upon the head $a$ and are connected at their outer ends to a cross head $A^3$. The cross head $A^3$ is connected to an axle $a^4$ upon which axle are mounted flanged wheels $a^5$. This axle and the wheels $a^5$ constitute in effect a traveling carriage. The connection between the cross head $A^3$ and the axle $a^4$ is effected in the example of my improvement shown by means of an extension from piston rods $A^4$, which piston rods are connected to the cross-head $A^3$ and extend to hydraulic pistons presently to be described.

Upon the axle $a^4$ are mounted sheaves $a^6$ of which in this example I have shown ten. These sheaves of course will partake of the to and fro movement of the traveling carriage. The carriage is adapted to be moved to and fro upon a track $a^7$ mounted upon a frame in any suitable manner. I have shown a portion $a^8$ of the frame in Fig. 4. From this portion of the frame brackets $a^9$ extend upwardly. In these brackets is journaled a shaft $a^{10}$ upon which shaft is mounted a number of sheaves $a^{11}$ corresponding in number to the sheaves upon the axle $a^4$. The diameters of the sheaves $a^6 a^{11}$ are substantially the same. Over these sheaves are passed cables $a^{12}$ of which I have shown four but of which any desired number may be used. The central sheave is grooved for and carries the four lifting cables which pass to the elevator car. I cause two of the cables to pass over and around five of each sheaves $a^6 a^{11}$ and the other two cables to pass over and around the other five of each of the sheaves $a^6 a^{11}$. The cables passing beneath the sheaves I have shown in black between the sheaves $a^6 a^{11}$. Five of the sheaves $a^6$ are separated from the other five of said sheaves by a separating bar $a^{13}$ connected to the cross head $A^3$ and also to the axle $a^4$. The thickness of this separating bar is only equal to that of two of the sheaves when placed side by side. It is connected to the axle $a^4$ opposite the central sheave $a^{11}$, therefore the space between the two sets of sheaves $a^6$ will be but half the width of the central sheave $a^{11}$, or that from which the cables pass to the car. This is advantageous because each pair of cables in passing from the sheave $a^{11}$ to a pair of the sheaves $a^6$ or vice versa, deflect at but half the angle that it would if the space between the sets of sheaves $a^6$ equaled the width of the central sheave $a^{11}$ as is commonly the practice; in other words half of the angle of deflection of the cable is taken up in the passage of the cables from the sheave $a^{11}$ to the sheaves $a^6$ and the other half of the angle is taken up in the passage of the cables back again from the sheaves $a^6$ to the sheaves $a^{11}$. This is advantageous because it greatly reduces the wear and tear upon the cables as they strike the flanges upon the sheaves at a much reduced angle.

Figures 4, 9:
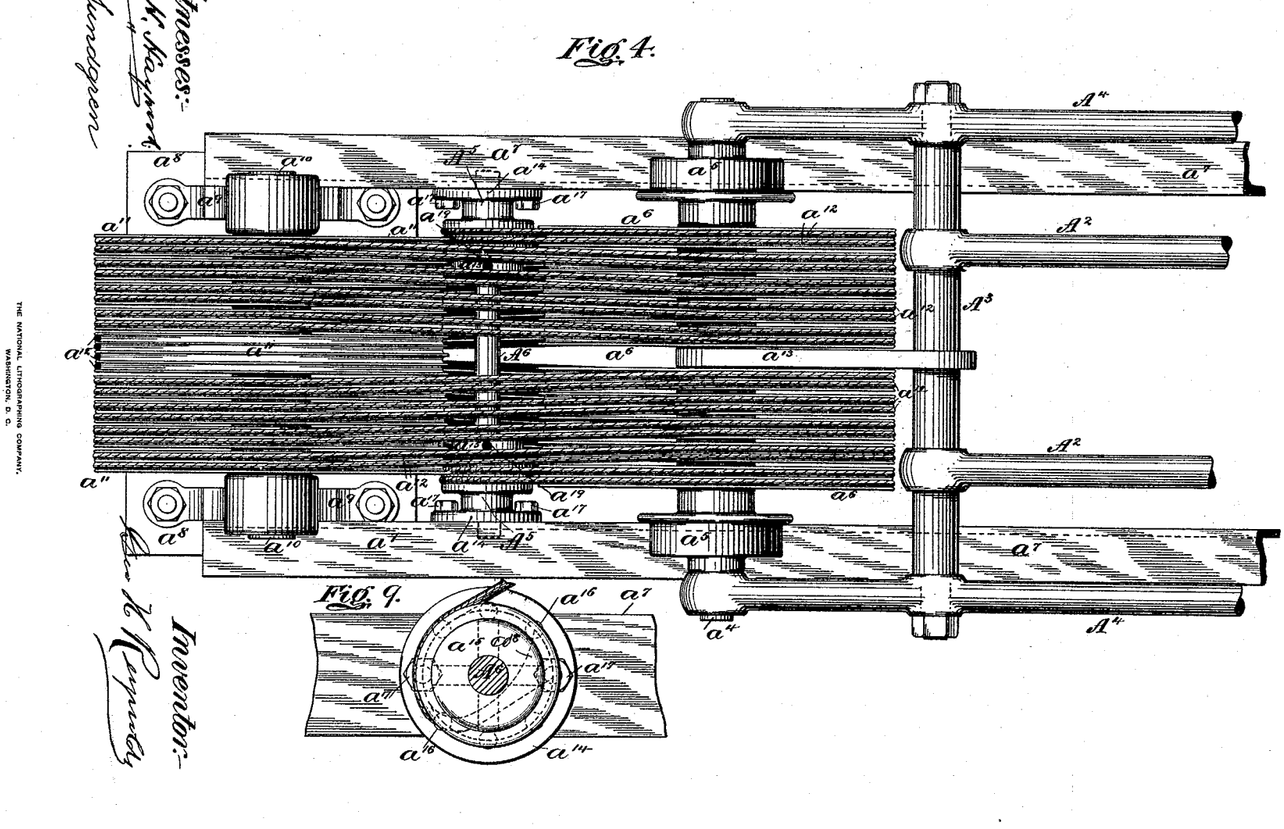
Fig. 4 is a plan or top view of another portion of the machine partly broken away and showing the sheave mechanism by which the cable is wound and unwound.
Fig. 9 is a detail also on an enlarged scale showing means which I employ for anchoring cables.

I have illustrated more clearly in Fig. 9 means for anchoring the cables consisting in passing their ends about tighteners $A^5$, one arranged upon each side of the machine. These tighteners are mounted loosely upon a shaft $A^6$ suitably journaled in the tracks $a^7$ of the machine. Each of the tighteners comprises a flanged portion $a^{14}$ and a windlass $a^{15}$. The windlass and the flanged portion are made integral. The flanged portion is provided with a number of holes $a^{16}$ through which bolts $a^{17}$ may be passed in order to secure the tighteners to the tracks. The windlass is circumferentially grooved to receive the end portions of the cables and is provided with a transversely extending and gradually expanding aperture $a^{18}$, into which the cable ends are passed and wherein molten metal is poured in order to secure the ends of the cable. When from any cause it is desired to tighten or slacken the cables, the bolts $a^{17}$ are removed and the tighteners are rotated in the desired direction until the proper tension upon the cables has been attained. This may be done by placing a bar in holes $a^{19}$ in the windlasses $a^{15}$ and operating the bar to rotate the tighteners. When the proper tension has been attained the bolts $a^{17}$ are again inserted to fix the tighteners in place. The rearward movement of the piston A' will of course draw the traveling carriage and consequently the sheaves $a^6$ forward. This results in taking up the cables upon the sheaves and the raising of the elevator car in the usual manner. It will thus be seen that the piston A' acts directly upon the hoisting mechanism to cause the operation of the latter. This operation is performed during the rearward stroke of the piston or in other words its stroke in the direction of the rear of the cylinder. Steam is introduced against the forward side of the piston through a port $b$ formed in the head $a$. This port communicates with a valve chamber $b^*$ with which there communicates a steam induction port $b^2$. The induction port is in this instance internally screw threaded and has secured within it a pipe $b^3$ the upper end of which is connected to the lower portion of a regulator presently to be described. Steam from any suitable source is delivered to the regulator through a pipe $b^4$.

Figure 2:
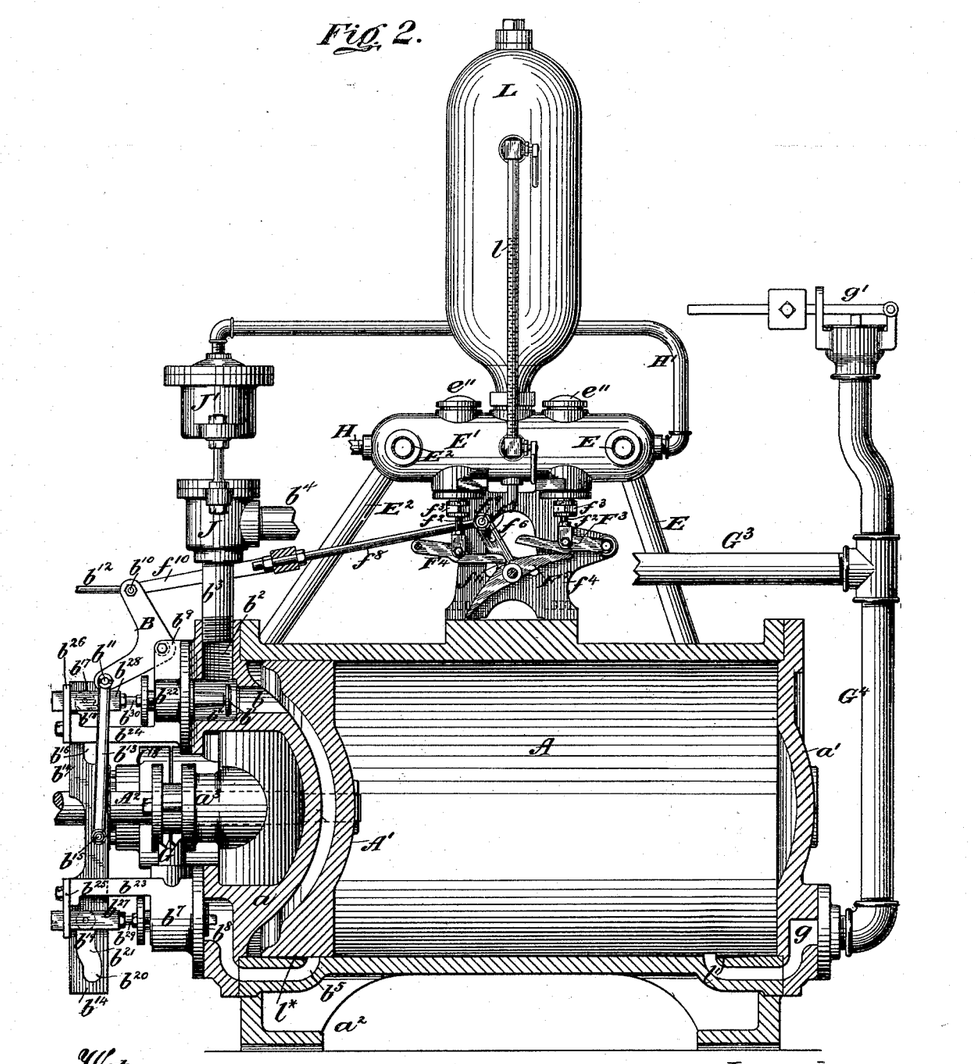
Fig. 2 is a side elevation of the same partly in vertical section and certain parts being broken away.

With the piston A' in the position illustrated more clearly in Fig. 2 the elevator car is just starting upwardly, the valve $b'$ being open to admit steam upon the forward side of the piston. As the piston moves rearwardly it uncovers an exhaust port $b^5$ formed partly within the head $a$. This exhaust port communicates with a valve chamber $b^6$ formed in a box $b^7$ secured upon the head $a$. The communication between the port $b^5$ and the valve chamber $b^6$ is adapted to be closed by a valve $b^8$ which valve is outside the valve chamber and within the exhaust port $b^5$. The valves $b'$ $b^8$ may both be closed at the same time or they may be automatically opened or closed as desired. When the piston is moving rearwardly or in a direction to raise the elevator car the valve $b'$ will as stated be opened but the valve $b^8$ will be closed. When the car is to be stopped, or is stopped, both said valves will be closed. When the piston is moved forward or in a direction to permit the car to descend the valve $b'$ will be closed to prevent the entrance of steam while the valve $b^8$ will be opened to admit of the outflow of the exhaust.

Figure 1:
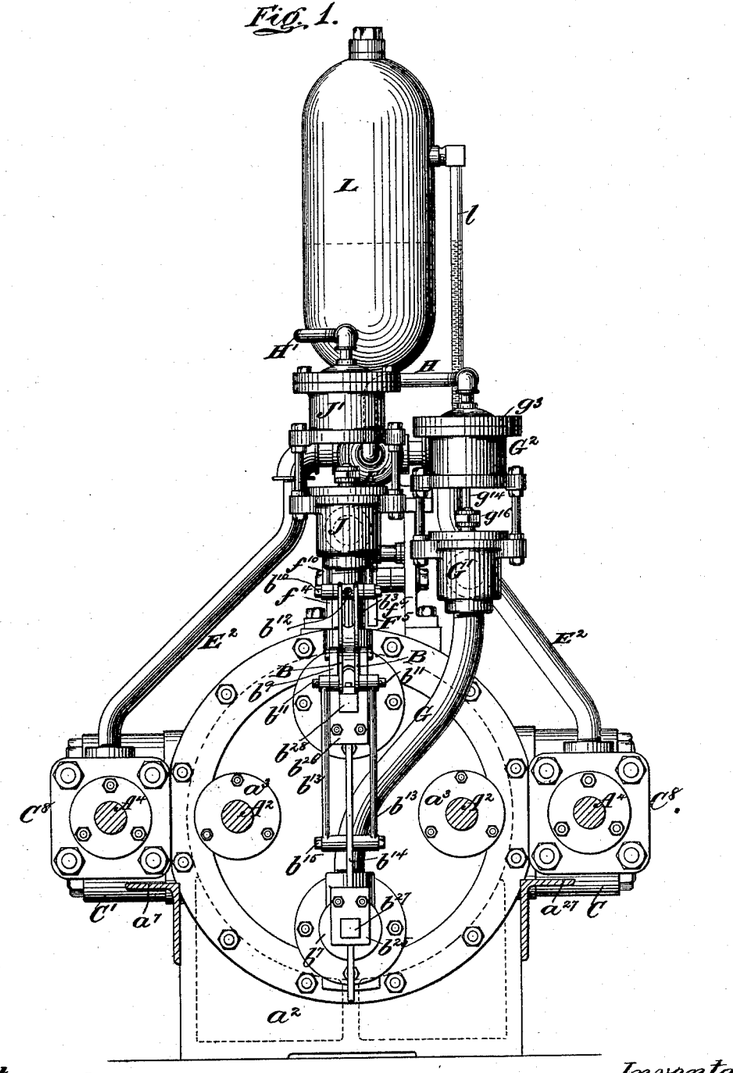
Figure 1 is a front elevation, partly in section showing certain of the apparatus which I employ.

The means which I have for causing the various operations of the valves consists in a bell-crank-lever B pivotally connected to lugs $b^9$ extending from a stuffing box $b^{22}$ upon the cylinder. This lever is shown as double or in other words provided with two upwardly extending parallel arms and two downwardly extending parallel arms. Each of these pairs of arms is connected together near its outer end by a transversely extending bolt the upper pair by the bolt $b^{10}$ and the lower pair by the bolt $b^{11}$. To the bolt $b^{10}$ and between the arms of the lever there is connected a rod $b^{12}$ which rod is connected to mechanism upon the car not shown whereby longitudinal movement may be imparted to the rod. Such longitudinal movement will of course cause the rocking of the lever upon its fulcrum. To the bolt $b^{11}$ are pivotally connected one of the ends of links $b^{13}$ the other ends of which are pivotally connected to a shifter plate $b^{14}$ one upon each side of said shifter plate by means of a bolt $b^{15}$. The shifter plate $b^{14}$ is provided near its upper end with a longitudinally extending slot; the lower portion $b^{16}$ of which is straight and the upper portion $b^{17}$ of which is also straight but not in line with the portion $b^{16}$. Intermediate of the portions $b^{16}$ $b^{17}$ is an angularly extending portion $b^{18}$. The straight portion $b^{16}$ is of considerably greater extent than is the portion $b^{17}$. Near the lower portion of said bar there is another longitudinally extending slot provided with the upper straight portion $b^{19}$. A lower straight portion $b^{20}$ out of line with the portion $b^{19}$ and with an intermediate angularly extending portion $b^{21}$. The portion $b^{19}$ is of considerably greater extent than the portion $b^{20}$. When the bell crank lever is rocked it will impart vertical longitudinal movement to the shifter plate in a direction dependent upon the direction of movement of the lever. The shifter plate is guided in its movements in suitable guideways formed in extensions $b^{23}$ $b^{24}$ the former extending from the valve chamber $b^7$ and the latter from the stuffing box $b^{22}$. To the outer ends of the extensions $b^{23}$ $b^{24}$ are secured plates $b^{25}$ $b^{26}$. These plates as shown more clearly in Fig. 1 are provided with squared apertures through which similarly formed metallic sliding pieces $b^{27}$ $b^{28}$ extend. The sliding piece $b^{27}$ is connected to a valve stem $b^{29}$ upon which is mounted the valve $b^8$. The sliding piece $b^{28}$ is connected to a valve stem $b^{30}$ upon which is mounted the valve $b'$. The sliding pieces $b^{27}$ $b^{28}$ are provided with vertically extending slots $b^{33}$ through which slots the shifter plate extends. These slots are of sufficient length to admit of a considerable longitudinal movement of the sliding pieces $b^{27}$ $b^{28}$ without imparting any side movement to the shifter plate. Mounted upon the sliding pieces $b^{27}$ $b^{28}$ and within the slots $b^{33}$ are anti-friction rollers $b^{31}$ $b^{32}$. These rollers extend into the upper and lower of the slots in the shifter plate respectively, consequently when longitudinal movement is imparted to the shifter plate, longitudinal movement may be imparted to both of the sliding pieces $b^{27}$ $b^{28}$.

Figure 5:
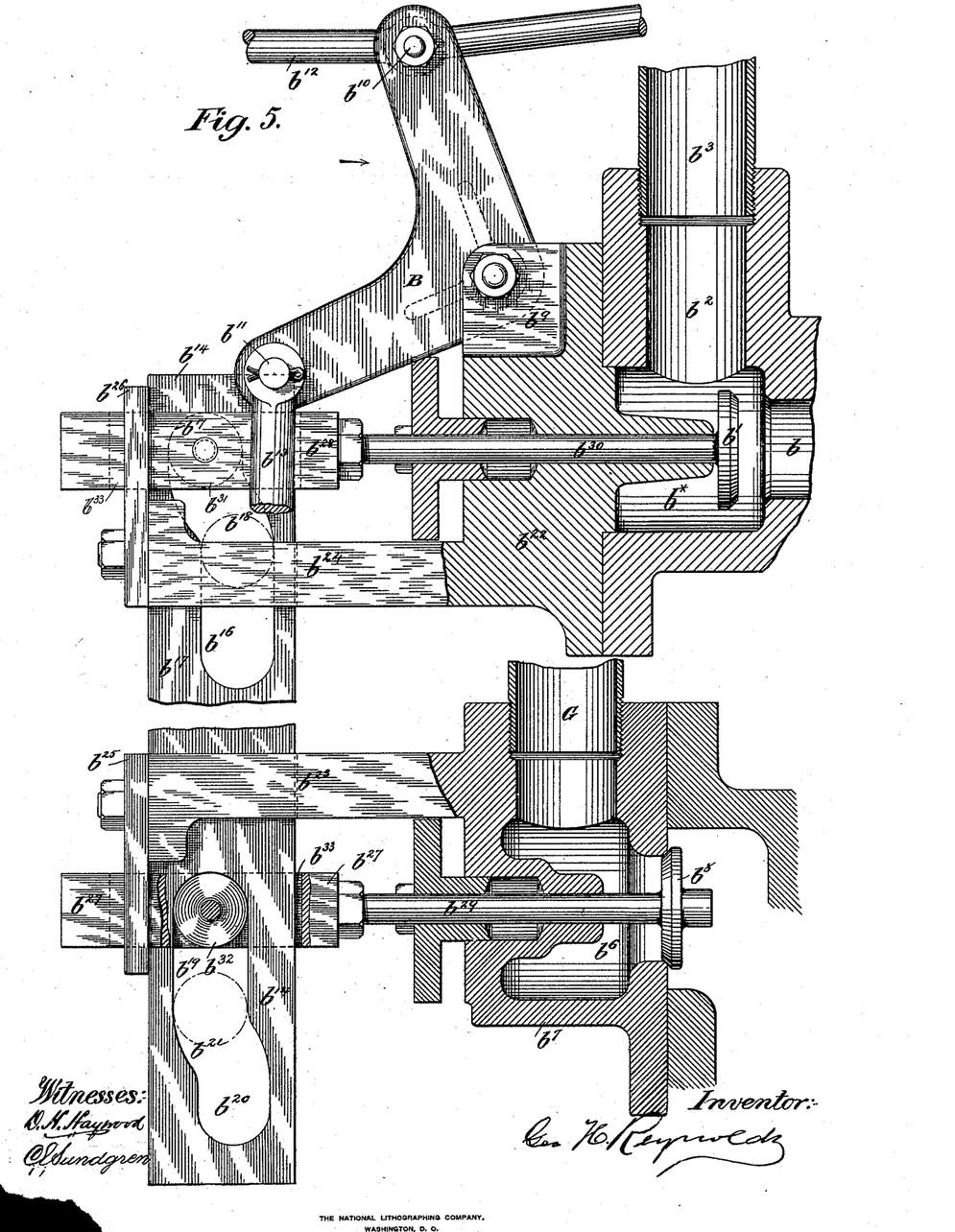
Fig. 5 is a detail view on an enlarged scale partly broken away and partly in section illustrating certain valve operating mechanism.

When the elevator is to be stopped the bell-crank-lever B is rocked in the direction of the arrow Fig. 5 thus raising the shifter plate. The roller $b^{31}$ will thus be caused to travel along the inclined portion $b^{18}$ of the slot and into the straight portion $b^{16}$, or in other words into the position shown more clearly in dotted lines. This movement causes a longitudinal movement of the sliding piece $b^{28}$ inwardly and sufficiently far to seat the valve $b'$ firmly upon its seat. This movement will not however affect the valve $b^8$ which will remain closed upon its seat for the reason that the movement of the shifter plate has not been sufficient to cause the roller $b^{32}$ to move out of the straight portion $b^{19}$ of its slot. When the elevator car is being raised the parts will occupy a position illustrated more clearly in Fig. 5. Assuming now that the car has been stopped and it is desired that the same shall descend the bell crank lever is still further rocked in the direction of the arrow Fig. 5. This will not affect the valve $b'$ which will remain closed because the roller $b^{31}$ is within the straight portion $b^{16}$ of its slot. The valve $b^8$ for the exhaust will however be opened because the roller $b^{32}$ will pass into the straight portion $b^{20}$ of its slot thus moving the valve $b^8$.

I have shown two hydraulic cylinders C C'. These hydraulic cylinders are arranged one upon each side of the steam cylinder and are secured to and supported by said steam cylinder. They are secured to the steam cylinder at about midway in their lengths and also at about midway in the length of the steam cylinder. This provides means for the expansion and contraction of the steam cylinder due to variations in temperature and prevents injury which might ensue from such cause were the hydraulic cylinders secured at their ends.

Within the hydraulic cylinders C C' are pistons $C^2$, arranged upon the piston rods $A^4$. One of these pistons together with a portion of a cylinder is illustrated more clearly in Fig. 6. As shown the pistons are composed of three parts $C^3$ $C^4$ $C^5$. The piston rod $A^4$ passes through these several parts and unites them all together by means of a nut $c$ engaging the end of the piston rod. The part $C^3$ of the piston comprises a main cylindrical portion $c'$, upon one end of which there is formed a ring like portion $c^2$ of less diameter than the portion $c'$. Extending from the ring like portion $c^2$ is a neck or hub like portion $c^5$. The part $C^5$ is provided with a centrally arranged internal socket $c^7$ adapted to receive the neck or hub like portion $c^5$ of the part $C^3$. Upon the inner end of the part $C^5$ there is formed a ring like portion $c^6$ of less diameter than the main or body portion of the part $C^5$ and extending round the socket $c^7$. The part $C^4$ is in the form of a ring and surrounds the neck or hub like portion $c^5$. It is arranged between the ring like portions $c^2$ $c^6$.

Figure 6:
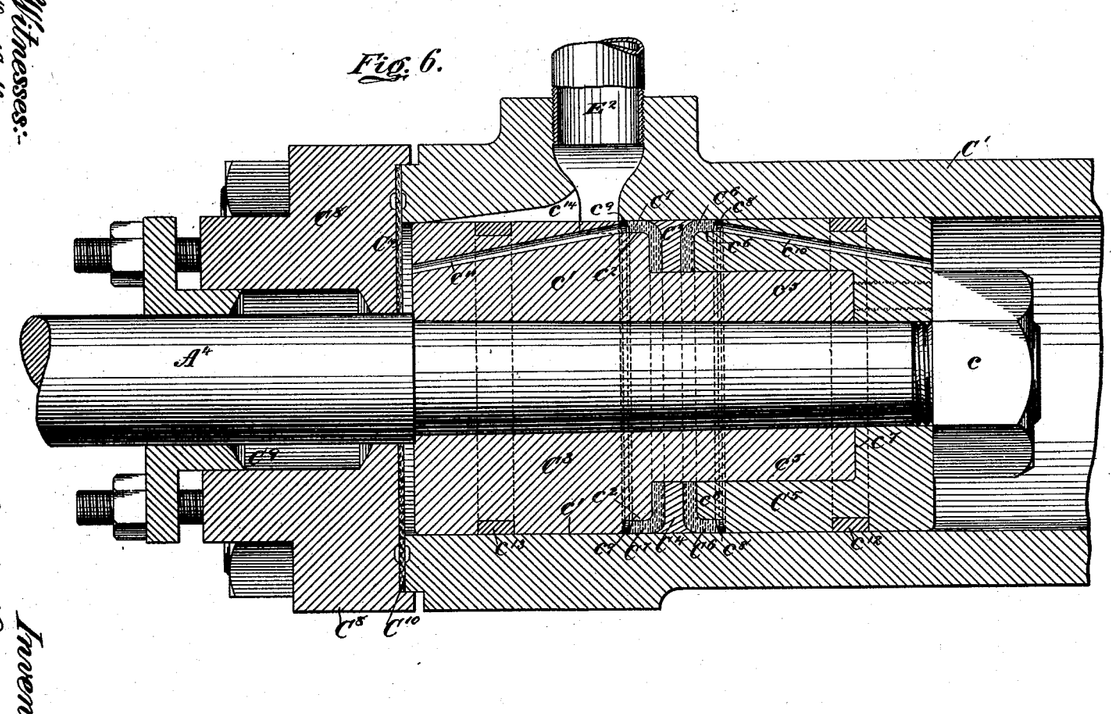
Fig. 6 is a vertical section on an enlarged scale of a hydraulic piston and a portion of a hydraulic cylinder.

$C^6$ $C^7$ designate packing rings which may be of leather or other suitable material. These rings at their outer edge portions lap over the peripheries of the ring like portions $c^2$ $c^6$ and their inner edge portions extend downwardly at the sides of said ring like portions $c^2 c^6$. The portion $C^4$ of the pistons is between said packing rings and it is to be observed that its periphery is somewhat flaring to assist in maintaining the packing rings in the position just described. The outer edges of the packing rings do not extend to the full depth of the ring like portions $c^2$ $c^6$ so that there will be spaces $c^8$ $c^9$ constituting circumferentially extending grooves or recesses between the outer edge of the packing ring $C^6$ and the main portion of the part $C^5$, and between the outer edge of the ring $C^7$ and the main portion of the part $C^3$.

$c^{10}$ designates a passage extending through the part $C^5$ and communicating at one end with the groove or recess $c^8$ and at its other end with the space within the cylinder.

$c^{11}$ designates a passage extending through the part $C^3$ and communicating at one end with the annular groove or recess $c^9$ and at the other end with the space within the cylinder. The passages $c^{10}$ $c^{11}$ extend in reverse directions and open at opposite ends of the piston.

Packing rings $c^{12}$ $c^{13}$ of ordinary construction are employed on the parts $C^3$ $C^5$.

In elevating apparatus of this character the pistons within the hydraulic cylinders are moved in both directions against the resistance offered by liquid contained in the cylinders; the piston in each cylinder operating to force the liquid from the cylinder at one end of the latter during its forward stroke and from the other end of the cylinder during its rearward stroke. During the movements of the piston the liquid within the cylinders is alternately transferred from one end to the other. The piston during its rearward movement or its movement in the direction of the arrow Fig. 3, will force the liquid contained in the cylinder outwardly through a pipe E and into a controller E' to be presently described. Water being admitted to the cylinder upon the other side of the piston by a pipe $E^2$, also communicating with said controller. The liquid is forced alternately to and fro through the pipes E $E^2$ and the controller E' during the movements of the piston. When the piston reaches the end of its stroke in either direction it closes the port to the pipe E or $E^2$ as the case may be; it does not however close such port suddenly but a leak for the liquid being forced by the piston is provided so that the shutting off of the liquid will be gradual and the piston will come easily and wholly to the end of its stroke. These leaks, one of which is provided at each end of the cylinder consists of groove $c^{14}$ cut or otherwise formed in the shell of the cylinder upon the inner side thereof. These grooves open into the ports communicating with the pipes E $E^2$ and are of gradually diminishing depth from said port to their other ends until they ultimately vanish upon the inner surface of the cylinder a little inward of the ends of the cylinder. Thus the piston upon being brought for instance into the position shown in Fig. 6, will force the liquid in front of it outwardly in a gradually decreasing quantity through the grooves $c^{14}$, until it reaches the point where said groove vanishes on the surface of the cylinder. Liquid then remaining between the end of the cylinder head and the piston will, a portion of it, be forced outwardly between the piston and the cylinder and through the groove $c^{14}$ and the balance will be forced through the passage $c^{11}$ into the annular groove or recess $c^9$ thus permitting the piston to come against the cylinder head easily and without jar. The liquid forced through the passage $c^{11}$ will operate to compress the packing ring $C^7$ and cause the latter to form a firm tight packing. The operation just described is repeated when the piston reaches the other end of its stroke.

The cylinder heads $C^8$ may be of ordinary construction and secured to the cylinder in the usual way. It is provided with a stuffing box $C^9$ through which the piston rod $A^4$ passes. Between the cylinder head and the cylinder is arranged a leather washer or packing $C^{10}$.

Figure 8:
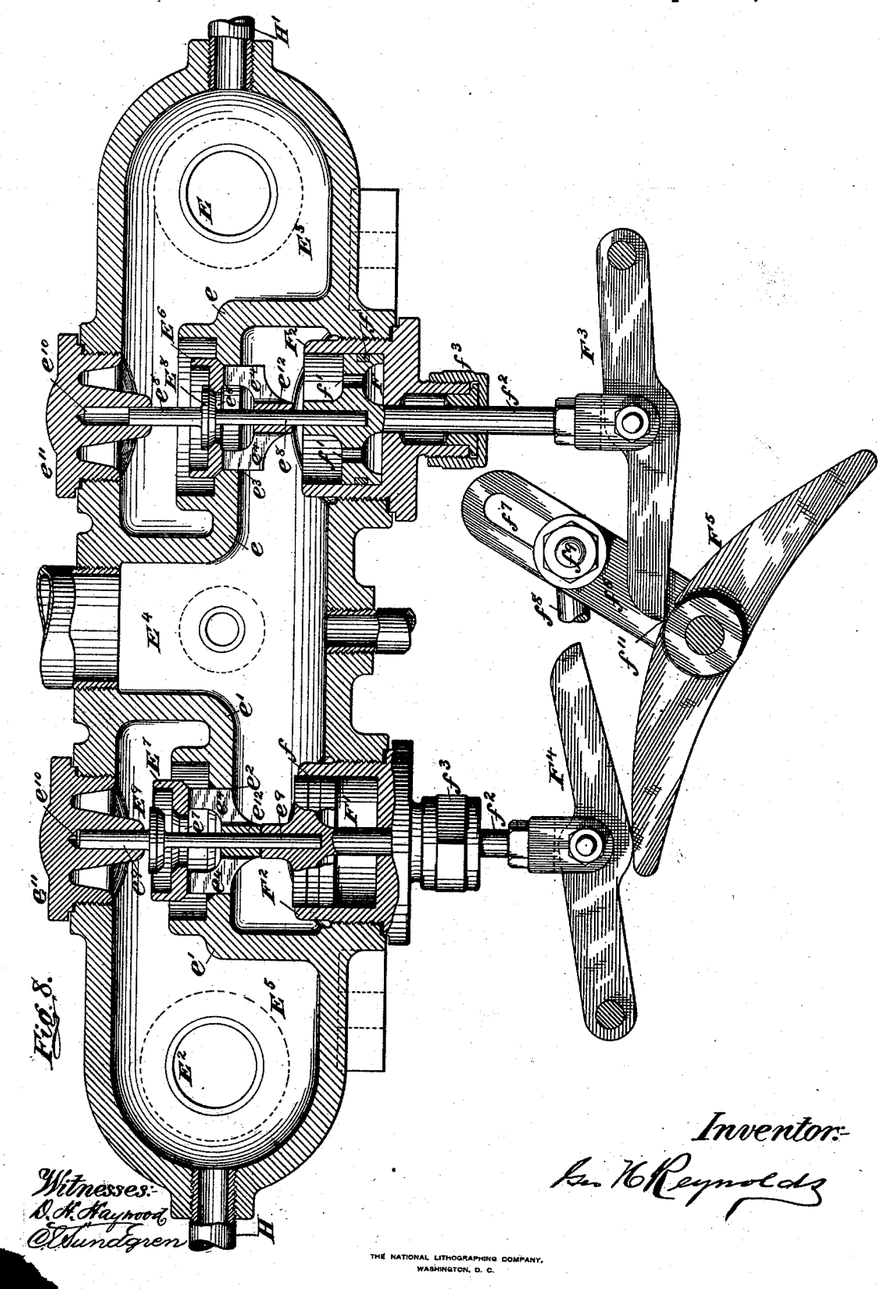
Fig. 8 is a vertical section on an enlarged scale of a certain controller which I employ and showing certain of its connections.

I will now describe the controller E'. This controller consists of a hollow metallic shell divided internally by diaphragms $e$ $e'$ into three compartments $E^3$ $E^4$ $E^5$. The compartments $E^3$ $E^5$ are at the end portions of the controller and the compartment $E^4$ is intermediate of the compartments $E^3$ $E^5$. Portions of the diaphragms $e$ $e'$ extend horizontally. These horizontal portions are provided with vertically extending apertures $e^2$ $e^3$ provided at their upper edges with suitably formed valve seats. Valves $E^6$ $E^7$ are adapted to close the apertures $e^2$ $e^3$. These valves are provided upon their under sides with wing guides $e^4$, which guide the valves in their up and down movement to admit of the free passage of liquid through the apertures $e^2$ $e^3$ when the valves are raised. The valves $E^6$ $E^7$ are provided centrally with apertures $e^6$ $e^7$ provided at their upper edges with suitably formed valve seats.

$E^8$ $E^9$ constitute valves which are adapted to be raised and lowered in order to open or close the apertures $e^6$ $e^7$. These valves are provided with spindles $e^8$ $e^9$, which spindles extend both above and below the valves. The upper ends of the spindles extend into sockets $e^{10}$ formed in screw plugs $e^{11}$ engaging suitably formed openings in the upper side of the controller. The lower portions of the spindles extend loosely through suitable openings formed in hub like portions $e^{12}$ with which the lower ends of the wing $e^4$ are connected. Below the hub like portions $e^{12}$ the spindles extend into sockets formed in projections upon the upper sides of slow closing devices F F'. The dash pots or slow closing devices F F' are as shown cylindrical and are arranged in short cylinders $F^2$ secured in screw-threaded apertures in the shell of the controller. On their peripheries they are provided with circumferentially extending packing rings $f$. Passages $f'$ extending through the slow closing devices afford communication between the upper and lower sides thereof. The slow closing devices have formed with them or secured to them spindles $f^2$ which extend through stuffing boxes $f^3$ upon the cylinders $F^2$. The outer ends of these spindles are connected to levers $F^3$ $F^4$ which levers are fulcrumed upon upright frames $f^4$ $f^5$ bolted to the steam cylinder A upon the upper side of the latter and serving to assist in supporting the controller E'. The connection between the spindles $f^2$ and the levers $F^3$ $F^4$ is about midway in the lengths of the latter.

$F^5$ designates a rocking lever fulcrumed at about midway in its length upon the frames $f^4$ $f^5$ and midway between the fulcrums of the levers $F^3$ $F^4$ but below said fulcrums. The rocking lever $F^5$ is provided upon its upper side with an arm $f^6$ which arm is provided near its outer end with a longitudinally extending slot $f^7$. A connecting rod $f^8$ is connected to the arm $f^6$ by means of a bolt $f^9$ passing through the slot $f^7$. The point of connection of the rod $f^8$ with the arm $f^6$ may thus be varied so as to bring said point nearer to or farther from the fulcrum of the lever $F^5$. The rod $f^8$ has a longitudinal movement and the adjustment of the point of connection between it and the arm $f^6$ will determine the degree of rocking movement to be imparted to the lever $F^5$. Longitudinal movement is imparted to the rod $f^3$ by means of the bell crank lever B, connection being made through a yoke $f^{10}$ to which said rod is connected; which yoke is connected at its ends to the bolt $b^{10}$. Thus in whichever direction the bell crank lever B is rocked, rocking movement will be imparted to the lever $F^5$. The outer or free end portions of the levers $F^3$ $F^4$ bear respectively upon the upper sides of the adjacent arms of the lever $F^5$. When therefore the lever $F^5$ is rocked it will cause one of the levers $F^3$ $F^4$ to be rocked upwardly and will permit the other of said levers to rock downwardly according to the direction in which the lever $F^5$ is rocked. I have shown the lever $F^5$ in Fig. 2 rocked so as to permit the lever $F^4$ to descend and so as to raise the lever $F^3$. In Fig. 8 I have shown the lever $F^4$ as raised and the lever $F^3$ as lowered. I have shown the upper side of the lever $F^5$ above its fulcrum as provided with a notch or indentation $f^{11}$ so that when either the levers $F^3$ or $F^4$ reach their lowermost position they will not be in contact with the lever $F^5$ as their outer ends will extend into the notch or indentation $f^{11}$.

Referring more particularly to Fig. 8 it will be seen that the elevation of the lever $F^4$ has caused the raising of the slow closing device $F'$ and consequently the raising of the valves $E^7$ $E^9$ from their seats. The raising of the valve $E^9$ from its seat will occur prior to the raising of the valve $E^7$ from its seat for the reason that when the slow closing device $F'$ and the valve $F^7$ occupy their normal positions there will be a space between them as shown more clearly to the right of Fig. 8, between the valve $E^6$ and slow closing device F. The continued movement of the slow closing device will however cause it to contact with the hub like portion $e^{12}$ and cause the raising of the valve $E^7$ from its seat. Communication is thus opened between the compartment $E^5$ and the compartment $E^4$ whereby liquid may pass from the former to the latter at first beneath the valve $E^9$ and subsequently beneath said valve and the valve $E^7$. The pressure of the liquid within the compartment $E^4$ will cause the raising of the valve $E^8$ from its seat, and if the pressure be sufficiently great the valve $E^6$ from its seat; thereby affording communication with the compartment $E^3$. Liquid entering the compartment $E^5$ will therefore circulate through the controller, passing from the pipes $E^2$ to the pipes E. If however circulation of the liquid in the reverse direction is to take place a similar raising of the slow closing device F, the valve $E^8$ and the valve $E^6$ to that just described takes place. This is owing to the raising of the lever $F^3$. During this movement however the valves $E^7$ $E^9$ will return to their seats and the slow closing device $F'$ will move downwardly into its normal position within the cylinder $F^2$. The return of said valves and slow closing device $F'$ to their normal positions is however gradual for the reason that during the passage of liquid from the compartment $E^5$ into the compartment $E^4$, a portion of the liquid has passed downwardly through the openings $f'$ to the under side of the slow closing device. The latter will therefore descend gradually because it descends against the resistance of the body of liquid below it which is being slowly forced outwardly through the openings $f'$. The valves $E^6$ $E^7$ $E^8$ $E^9$ return to their seats by gravity but the slow closing devices F $F'$ are drawn down to their lowermost position by the weight below them. Violent seating of the valves upon their seats is prevented by the slow closing devices.

I may here remark that as shown in the drawings liquid will pass from the forward ends of the hydraulic cylinders C C' through the pipes $E^2$ and into the compartment $E^5$ in the controller; it will also pass from the rear ends of the hydraulic cylinders through the pipes E into the compartment $E^3$ in the controller. The latter operation takes place when the pistons $C^2$ in the hydraulic cylinders are moving rearwardly or in the direction of the arrow Fig. 3 and the former operation takes place when said pistons are moving forwardly; thus when the lever $F^3$ is raised liquid will flow from the compartment $E^3$ in the controller through the compartment $E^4$, and into the compartment $E^5$ and when the lever $F^4$ is raised will flow from the compartment $E^5$ through the compartment $E^4$ and into the compartment $E^3$. The raising of the lever $F^3$ therefore occurs when the car is to be elevated and simultaneously with the opening of the valve $b'$ to admit steam forward of the piston. When the car is to be stopped the lever $F^5$ is so rocked as to permit both the levers $F^3$ $F^4$ to descend and all the valves $E^6$ $E^7$ $E^8$ $E^9$ to be closed upon their seats. The elevator car is then positively prevented by the liquid from moving in either direction. When the car is to be lowered the lever $F^4$ is raised so as to permit the flow of liquid from the pipes $E^2$. During the downward movement of the car the pistons $C^2$ move forwardly forcing the liquid through the pipes $E^2$ and into the controller. During this movement also the steam piston $A'$ is being moved forward, it and the pistons $C^2$ being thus moved by the weight of the car. The bell crank lever B has however been rocked so as to cause the closing of the valve $b'$ upon its seat and the lifting of the valve $b^8$ from its seat. The introduction of steam to the cylinder A is therefore prevented forward of the piston. The exhaust however will pass outwardly through the port $b^5$ and into the chamber $b^6$. From thence the exhaust passes through a pipe G to a portion $G'$ of a regulator $G'$ $G^2$. From said portion $G'$ of the regulator the exhaust passes through a pipe $G^3$ to a stand pipe $G^4$ the lower end of which communicates with one end of an exhaust port $g$ the other end of which port opens upon the interior of the cylinder A near the rear end of the latter; thus the exhaust from the forward side of piston is caused to act upon the rear side of the piston to assist in returning the latter to its forward position. Any excess of pressure from the exhaust may escape through a safety valve $g'$ upon the upper end of the pipe $G^4$.

The regulator $G'$ $G^2$ is for the purpose of automatically regulating the degree of the exhaust, thus if the car should start to descend too rapidly the increased pressure due to the more rapid movement of the pistons $C^2$ in the hydraulic cylinders will cause such an operation of the regulator $G'$ $G^2$ as will choke the exhaust and thus automatically maintain the exhaust at a uniform pressure and speed. The movement of the pistons $A'$ $C^2$ will thus also automatically be kept at a uniform speed as will also be the downward movement of the car.

Figure 7:
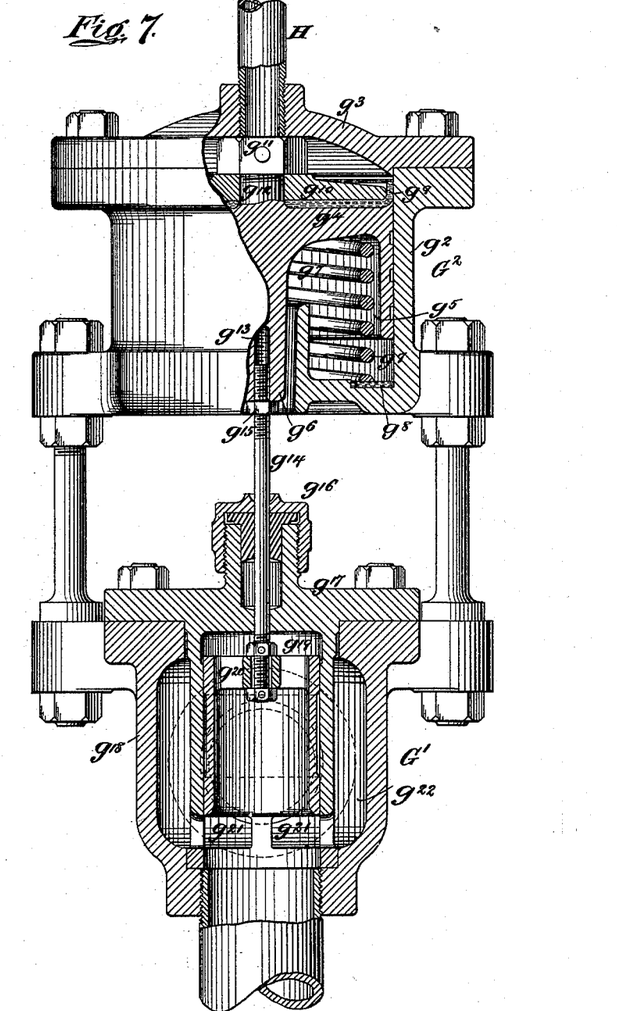
Fig. 7 is an elevation on an enlarged scale partly in section and partly broken away of one of certain regulators which I employ.

The automatic regulation is accomplished as follows: When the hydraulic pistons move too rapidly during the descent of the car the undue pressure caused thereby is transmitted to the liquid in the controller. The excess of pressure in the controller is utilized in regulating the regulator $G'$ $G^2$. Communicating with one end of the controller is a pipe H the other end of which enters the top of the portion $G^2$ of the regulator $G'$ $G^2$. The portion $G^2$ of the regulator comprises a main case or shell $g^2$ having an open top and a closed bottom. Its top is closed by a cap $g^3$ secured to the shell. Within the portion $g^2$ is a piston $g^4$. This piston is provided internally and upon its under side with an annular recess $g^5$. The top of the piston is closed. From the under side there extends downwardly and about centrally a projection $g^6$. Within the recess $g^5$ is arranged a coil spring $g^7$ one end of which bears against the top of the piston and the other end of which bears against a washer $g^8$ in the bottom of the shell $g^2$. I have shown the top of the shell as provided with a packing ring $g^9$ which packing ring is secured to the top of the piston by a disk or plate $g^{10}$. The disk or plate is of less diameter than is the piston to admit of the outer edge of the packing ring $g^9$ being turned up so as to present a flat side of the packing ring to the inner surface of the shell. The disk or plate $g^{10}$ is secured in position by means of a nut $g^{11}$ engaging a screw-threaded projection $g^{12}$ upon the upper side of the piston, which projection extends through a central aperture in the disk or plate $g^{10}$. The lower portion of the projection $g^6$ is provided with a screw-threaded socket $g^{13}$ extending longitudinally thereof. With this socket engages one end of a rod $g^{14}$. When properly connected a set nut $g^{15}$ may be employed to prevent the rotation of the rod. The rod after passing below the portion $G^2$ of the regulator extends through a stuffing box $g^{16}$ which may be of ordinary construction and is located upon a cover $g^{17}$ for a main case or shell $g^{18}$ comprised in the portion $G'$ of the regulator. After passing through the stuffing box $g^{16}$ the rod extends into a cylinder $g^{19}$ which cylinder in this instance extends downwardly from and is made integral with the cover $g^{17}$. Within the cylinder $g^{19}$ is a piston $g^{20}$ to which piston the rod $g^{14}$ is connected as shown by means of clamping nuts. It will thus be seen that any movement of the piston $g^4$ will be transmitted to the piston $g^{20}$. The lower portion of the cylinder $g^{19}$ is provided with openings $g^{21}$ which openings communicate with an annular passage $g^{22}$ which passage is in communication with the pipe $G^3$ through which the exhaust is conveyed from the portion $G'$. If now undue pressure in the manner previously described is caused in the controller the excess of pressure will be transmitted through the column of liquid in the pipe H to the interior of the portion $G^2$ of the regulator above the piston $g^4$. This will cause the piston to be forced downwardly against the resistance of the spring $g^7$. This downward movement will cause the downward movement of the rod $g^{14}$ and of the piston $g^{20}$. The latter as it moves downwardly will partially close the openings $g^{21}$, thus choking the exhaust. The degree to which said choking extends is regulated by the pressure exerted upon the piston $g^4$. As the exhaust thus becomes choked, pressure from the exhaust will be backed up in front of the piston $A'$ and will lessen the movement of said piston and consequently the movements of the pistons $C^2$ in the hydraulic cylinders. The movement of the pistons being thus reduced normal pressure will be restored and the piston $g^4$ will be permitted to rise, the lift being accomplished by the spring $g^7$. The piston $g^{20}$ will also rise thus increasing the area of the openings $g^{21}$. It will thus be seen that by the regulator $G'$ $G^2$ a uniform movement of the pistons $A'$ $C^2$ and also of the car in a downward direction, will be automatically effected; as slight changes in pressure in the controller will cause the operation of the regulator.

J J' designate another regulator which regulator is for the purpose of maintaining uniform rates of speed in the movements of the pistons $A'$ $C^2$ and of the car when the latter is moving upwardly. This regulator prevents excess of steam pressure being brought to bear upon the piston $A'$ in order to move the latter rearwardly and cause the elevation of the car. The construction and operation of the regulator J J' is in all respects like that of the regulator $G'$ $G^2$ previously described and a further detailed description will therefore be unnecessary. There is this difference however, that steam enters the portion J of the regulator through the pipe $b^4$ and passes downwardly through the pipe $b^3$ of the valve chamber from which steam is admitted to the cylinder A. Excess of pressure will be conveyed from the controller through a column of liquid in a pipe H' to the portion J' and above the piston, corresponding to the piston $g^4$. The downward movement of said piston will cause the movement of a piston corresponding to the piston $g^{20}$ in order to partially close the openings $g^{21}$ and choke the incoming steam from the pipe $b^4$. By this means a uniform pressure of steam will be maintained forward of the piston A' and the rearward movements of said piston and of the piston $C^2$ will be automatically maintained at a uniform rate of speed. The car also in its upward movement will by such means be caused to move at a uniform rate of speed. It is to be observed that the uniform rate of speed of the car when moving in both directions is maintained through the action of the liquid circulating in the hydraulic portion of the apparatus.

It is obvious that during the rearward movement of the pistons $C^2$ in the hydraulic cylinders less liquid can be delivered forward of said pistons than is being forced outwardly at the rear thereof for the reason that the piston rods $A^4$ take up considerable of the space which is forward of the piston. It will be equally obvious that when said pistons are moving forward, less liquid will be delivered from the front of the pistons than is required to fill the space to the rear of the pistons. In order to overcome this difficulty I employ an auxiliary reservoir L which reservoir in this instance extends upwardly from and is secured upon the controller E'. This reservoir affords a yielding column of liquid communicating with the circulating channels and, as shown, consists of a hollow metallic shell fitted at its upper end with a screw-threaded plug by which liquid may be introduced to it when desired. The lower end of the reservoir is in open communication with the interior of the controller E'. I have shown a gage glass $l$ connected at its upper end with the reservoir L near the top of the latter and connected at its other end with the controller E' at the side of the latter. By this means the height of liquid contained in the reservoir may always be readily ascertained. The surplus liquid delivered to the controller from the rear sides of the pistons $C^2$ will be taken up within the auxiliary reservoir L during the rearward movement of the pistons $C^2$. During the forward movement of said pistons such excess of liquid will be delivered to the rear of the pistons in order to properly fill the spaces. By this means there will be no back pressure when the pistons are moving rearwardly nor suction when the pistons are moving forward. As previously stated the piston A in its forward movement operates at or about the end of its stroke to close the port $b^5$. At or near the end of the rearward stroke of said piston it operates to close the port $g$. The exhaust to the rear of said piston is delivered during the latter stroke through the port $g$ into the pipe $G^4$ and thence out at the safety valve $g'$. The closing of said ports is however not instantaneous but is gradual. The gradual closing of the ports being effected in manner similar to that previously described for closing the ports $c^{14}$ in the hydraulic cylinders.

The cylinder A is provided upon its inner surface with longitudinally extending grooves $l^*$ $l'$ the former being at the forward end of the cylinder and the latter at the rearward end. These grooves taper; opening at their depressed part into the ports $b^5$ $g$ and gradually lessening in depth until they vanish upon the inner surface of the cylinder near the ends of the latter. Gradually lessening quantities of steam will therefore pass through the grooves $l^*$ $l'$ into the ports $b^5$ $g$, as the piston nears the ends of its strokes. The leak thus afforded will cause the piston to come gently to the ends of its strokes and all pounding of the piston against the ends of the cylinder will be prevented.

What I claim as my invention, and desire to secure by Letters Patent, is—

1. The combination with hoisting apparatus, of a steam cylinder provided at one end with an induction port for steam and an exhaust port and at the other end with an exhaust port, valves for said ports, a piston within said cylinder, a connection between said piston and the hoisting apparatus, a communication between said exhaust ports whereby the exhaust may flow from in front of the piston to the rear of the latter when the piston is moving forwardly, a hydraulic cylinder, a piston within said cylinder and a connection between said piston and the hoisting apparatus, the flow of steam to said steam cylinder and the exhaust from one end of said cylinder being controlled by the movements of said hydraulic piston, substantially as specified.

2. The combination with hoisting apparatus, of a steam cylinder provided at one end with an induction port for steam and an exhaust port, and at the other end with an exhaust port, communicating channels leading from said exhaust ports and valves in said channels, a piston within said cylinder, a connection between said piston and the hoisting apparatus, a hydraulic cylinder, a piston within said cylinder, a connection between said piston and the hoisting apparatus, and a regulator and means for shifting the same automatically by the movement of said hydraulic piston in one direction, said regulator being provided with a valve to control the flow of live steam to one side of the steam piston, substantially as specified.

3. The combination with hoisting apparatus, of a steam cylinder provided at one end with an induction port for steam and an exhaust port, and at the other end with an exhaust port, said exhaust ports communicating with connecting channels and valves for said ports, a piston within said cylinder, a connection between said piston and the hoisting apparatus, a hydraulic cylinder, a piston within said cylinder, a connection between said piston and the hoisting apparatus, and a regulator and connections whereby to automatically operate said regulator by the movement of the hydraulic piston in one direction, said regulator provided with a valve arranged to control the flow of the exhaust from one side of the steam piston, substantially as specified.

4. The combination with hoisting apparatus, of a steam cylinder provided at one end with an induction port for steam and an exhaust port, and at the other end with an exhaust port, the exhaust ports communicating with connecting channels and valves for said ports, a piston within said cylinder, a connection between said piston and the hoisting apparatus, a hydraulic cylinder, a piston within said hydraulic cylinder, a connection between said piston and the hoisting apparatus, a communication between opposite ends of said hydraulic cylinder through which liquid will be forced by the movements of the piston from one end of the cylinder to the other, a regulator provided with a valve for controlling the admission of live steam to one side of the steam piston, and a pipe or passage between said communication and said regulator whereby the pressure of the liquid while in circulation is admitted to operate the regulator valve to control the flow of the motor fluid, substantially as specified.

5. The combination with hoisting apparatus, of a steam cylinder provided at one end with an induction port for steam and an exhaust port, and at the other end with an exhaust port connecting channels communicating with said ports, valves for said ports, a piston within said cylinder, a connection between said piston and the hoisting apparatus, a hydraulic cylinder, a piston within said hydraulic cylinder, a connection between said piston and the hoisting apparatus, a communication between opposite ends of said hydraulic cylinder through which liquid will be forced by the movements of the piston from one end of the cylinder to the other, a regulator provided with a valve for controlling the outflow of the exhaust from one side of the steam piston and a pipe or passage between said communication and said regulator whereby the pressure of the liquid while in circulation will operate the regulator valve with valves to control the outflow of the exhaust, substantially as specified.

6. The combination of the steam and water cylinders and pistons connected to move together, of circulating passages for the water between the ends of the water cylinder, two partially automatic valves $E^6$ $E^7$ arranged to control the flow of water through said passages in opposite directions and connections between the said valves and the cage and two valves $E^8$ $E^9$, and actuating means and constructed and arranged one to open under pressure from one direction and the other to open under pressure from the other direction, substantially as set forth.

7. The combination of the steam and water cylinder and pistons connected to move together, of passages connecting the opposite ends of the water cylinder and provided with controlling valves and regulators connected with said passages upon opposite sides of said valves to be operated by the pressure in said passages, one regulator provided with a valve controlling the motor steam and the other with a valve controlling the exhaust steam, substantially as set forth.

8. The combination with the valves $E^6$ $E^7$ constructed and arranged to open automatically under certain pressure and also to be positively opened, and operating means controlling the flow of liquid in opposite directions between the ends of the water cylinder, of two valves $E^8$ $E^9$ arranged to lift under pressure of the water in opposite directions, controlled by the valves $E^6$ $E^7$ and means for actuating said valves $E^8$ $E^9$ substantially as set forth.

9. The combination with hoisting apparatus, of a steam cylinder, a piston within said cylinder, a connection between said piston and the hoisting apparatus, a hydraulic cylinder, a piston in said cylinder, a connection between said piston and the hoisting apparatus, a controller divided internally into two compartments, pipes or passages affording communication between opposite ends of said hydraulic cylinder and separate compartments in said controller, valves for controlling the flow of liquid through the controller, and mechanism substantially such as described operated from the elevator car for operating said valves, substantially as specified.

10. The combination with hoisting apparatus, of a steam cylinder, a piston within said cylinder, a connection between said piston and the hoisting apparatus, a hydraulic cylinder, a piston in said cylinder, a connection between said piston and the hoisting apparatus, a controller divided internally into compartments, pipes or passages affording communication between opposite ends of said hydraulic cylinder and separate compartments in said controller, valves for controlling the flow of liquid through the controller in reverse directions, and mechanism substantially such as described connected with the elevator car, for alternately raising said valves to permit the flow of liquid in either direction, said valves being upon their seats when the elevator car is at rest, substantially as specified.

GEO. H. REYNOLDS.

Witnesses:
 FREDK. HAYNES.
 K. E. PEMBLETON.